United States Patent [19]

Game et al.

[11] 4,204,751
[45] May 27, 1980

[54] METHOD AND APPARATUS FOR SYNCHRONIZING THE READING OF AUDIBLE AND VISUAL INFORMATION CARRIED BY DIFFERENT SUPPORTS

[75] Inventors: Jacques-Marie N. Game, Ville d'Avray; Bernard A. Tiesse, Verrieres-le-Buisson, both of France

[73] Assignee: Sogitec, Boulogne, France

[21] Appl. No.: 868,714

[22] Filed: Jan. 11, 1978

[30] Foreign Application Priority Data

Nov. 28, 1977 [FR] France ............................. 77 35788

[51] Int. Cl.² .......................................... G03B 31/04
[52] U.S. Cl. ....................................... 352/17; 352/31
[58] Field of Search ................... 352/5, 12, 21, 25, 31, 352/38, 40, 17, 15, 16

[56] References Cited

U.S. PATENT DOCUMENTS

| | | | |
|---|---|---|---|
| 3,979,774 | 9/1976 | Chen et al. | 352/12 X |
| 4,027,958 | 6/1977 | Shigeta et al. | 352/17 X |

*Primary Examiner*—Michael L. Gellner
*Attorney, Agent, or Firm*—Brooks, Haidt, Haffner & Delahunty

[57] ABSTRACT

The sound support comprises an address track with coded words dividing the sound support into consecutive sections, each associated with a particular address. The positioning of the sound support is controlled in such a manner as to advance a section of the sound support bearing a predetermined address, to the level of a reading head. The video support comprises images, each associated with a particular address, and its positioning is controlled so as to advance in front of a projection gate an image having a predetermined address. The simultaneous running of the sound and video supports are then controlled, the speed of image projection being able to vary and being controlled according to pre-recorded instructions on a control data support, the access to which is neither related to the advance motion of the sound support nor to the image support.

8 Claims, 5 Drawing Figures

METHOD AND APPARATUS FOR SYNCHRONIZING THE READING OF AUDIBLE AND VISUAL INFORMATION CARRIED BY DIFFERENT SUPPORTS

The present invention relates to a method for synchronizing the reading of audible and visual information carried by different supports, so as to record or restitute audiovisual sequences.

The systems for synchronizing image and sound generally use a common support for the visual information and the audible informations, for example a sound film or a video magnetic tape.

Systems are also known in which the images and the sound are run on different supports; that is, for example, the case of systems projecting slides with reproduction of a recorded text. With such systems, it is necessary to synchronize the advance of both supports and this is always obtained by controlling the advance of one of the supports by a synchronizing signal, i.e. pulses, read off the audio support. It is generally the advance of the video support which is controlled from pulses read off the audio support, and thus resulting in fairly inflexible systems which do not enable as desired, modifying either the text accompanying an image sequence, the images, or the running speed of images accompanying a given sound sequence.

The object of the present invention is to provide a process which, starting from a sound-data bank in the form of listed sequences, and from an image-data bank, also in the form of listed sequences, makes it possible to synchronize sound and image sequences, either for recording them on a single support for subsequent reproduction, or for restituting them directly in the form of audiovisual sequences, without the speed of one of the supports being entirely dependent on the other.

As claimed for this invention, the object is attained by a method comprising:

the positioning of the sound support which comprises an address track with coded words dividing the sound support into consecutive sections, each associated with a particular address, the positioning being controlled in such a manner as to advance a section of the sound support, bearing a predetermined address, to the level of a reading head, the positioning control of the video support comprising images, each associated with a particular address, in such a manner as to advance in front of a projection gate an image having a predetermined address, and, controlling the simultaneous advance of the sound and video supports; the speed of image projection being able to vary and being controlled according to pre-recorded instructions on a control data support, the access to which is neither related to the advance motion of the sound support nor to the video support.

An audiovisual sequence is defined by the addresses associated with the first and last image frames of this sequence, the running speed of the images during this sequence, and the addresses associated with the sections of the sound support corresponding to the beginning and the end of the sequence. The start of a sequence is synchronized when the video and sound supports are correctly positioned; and the end of the sequence occurs when the address of the last image frame and that of the end of the sound sequence are reached.

It is thus possible to have independent access to sound and image data banks which for example, allows projection of the same video sequence with commentary in different languages. Another substantial advantage resides in the fact that the image advance is not controlled by the sound support. It is therefore possible to have slower projection speeds or still views without it being necessary to multiply identical images on the video support or to run off the sound support.

In the event of short sequences, the risk of desynchronization is limited and, in any case, resynchronizing takes place at the beginning of each audovisual sequence, as both supports always start in synchronization.

However, particularly in long sequences, it is preferable to adjust the running speed of one of the supports as a function of the unwanted variations of the running speed of the other support. Preferably, for a given audiovisual sequence, an initial running speed is set for frame advance and the sound support advance is slaved to the frame advance in order to continuously eliminate possible stagger between the two supports.

If necessary, it is preferable to slightly vary the speed of projection, this being imperceptible to the eye, rather than the running speed of the sound support, which is very perceptible to the ear.

Is should be noted that this does not mean that the image frame advance is controlled by that of the sound support, since the advance speed of the image frames can always be selected arbitrarily, independently from the data recorded on the sound support.

A further purpose of the invention is to provide a device for operating the synchronization process compatible to the invention.

This purpose is achieved by a device comprising: first remote-controlled drive means for advancing the sound support in front of a reading head; a first remote control unit for operating said first drive means, said first remote control unit comprising first detecting means for identifying the section of the sound support running in front of said reading head; second remote-controlled drive means for advancing an image frames support through a projection gate, said second drive means including speed adjusting means for varying the image frames advance speed; a second remote control unit for operating said second drive means, said second remote control unit comprising second detecting means for identifying the image frame in front of said projection gate; and synchronization means for synchronizing the operation of the first and second drive means, said synchronization means being external to said first and second drive means, being connected to said first and second remote control units for operating the drive synchronization, and being connected to said speed adjusting means for controlling the image frames advance in compliance to pre-recorded data with access linked neither to the sound support run nor to that of the video support.

Preferably, the speed adjusting means comprise a signal generator, for delivering a signal having a frequency which determines the running speed of the image frames; and the generator comprises a time base delivering clock pulses, an adjustable frequency divider connected to the time base, and slaving means receiving a signal representative of the running speed of the sound support and connected to said generator.

The synchronization means comprise a memory for storing sets of data elements, each set relating to an audiovisual sequence and comprising the data identifying the start and end image frames of the video part of the audiovisual sequence, the sections of the sound support corresponding to the beginning and to the end of the sound part of the audiovisual sequence, and, eventually, the running speed of the image frames during this sequence.

Other objects and features of the invention will be readily apparent from the following description, with reference to the accompanying drawings.

Figure 1:
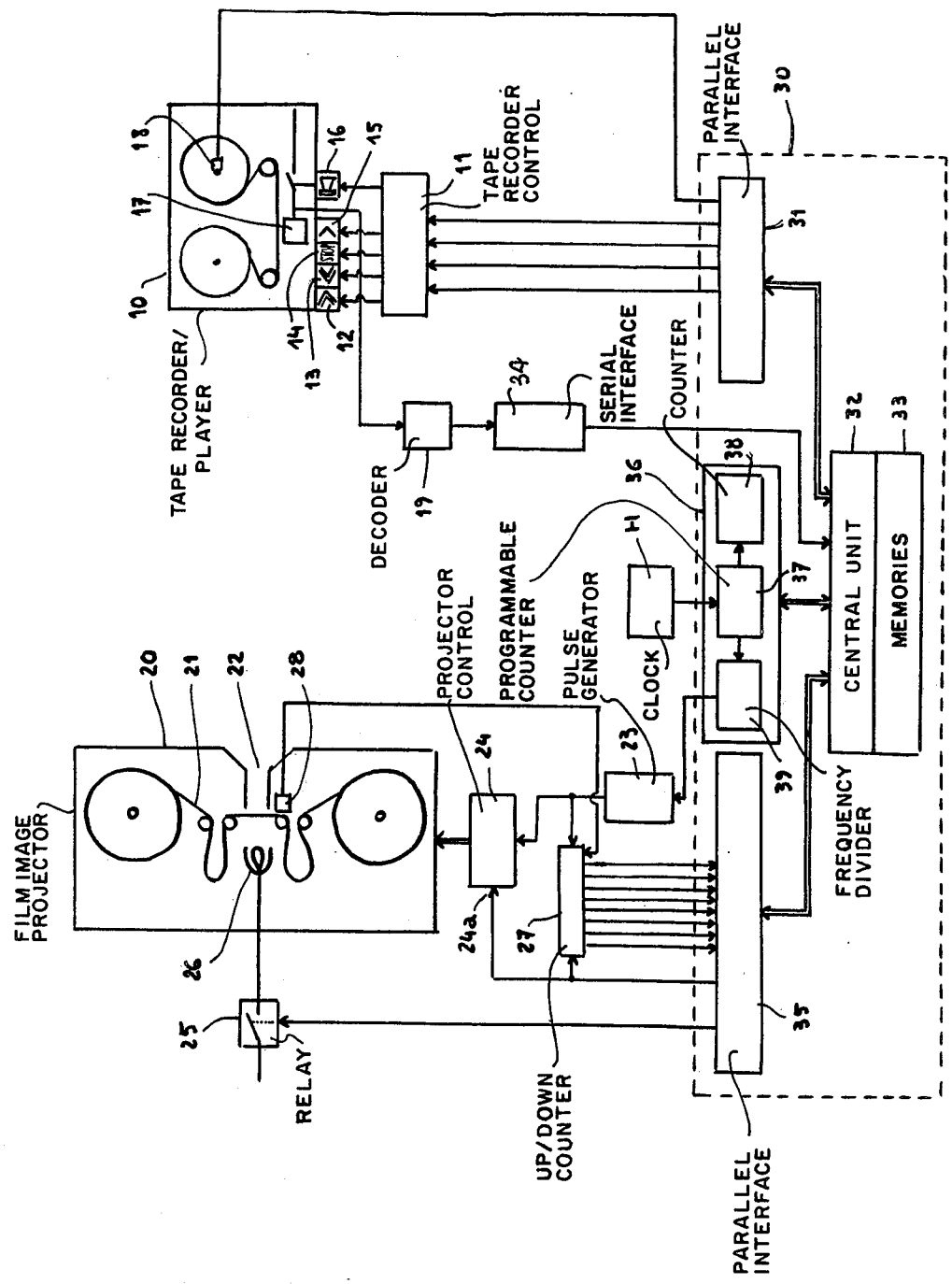
FIG. 1 is a very schematic general view of a device compatible to the invention.

FIG. 1 diagrammatically shows a device comprising an apparatus for reproducing sounds, for example a cassette tape recorder 10, and an apparatus for projecting images, for example a projector 20 with variable frame advance speed. The tape recorder and the projector are operated by a synchronization unit 30.

The tape recorder 10 is remote-controlled and comprises a circuit 11 for controlling the driving motor or motors and the reading head or heads in response to control signals delivered by the synchronization unit, for controlling various functions such as: fast forward motion of the tape, fast rewind, stop, normal tape running with reading of the tape, and reproduction of information read off the tape. These functions are schematically shown in 12 to 16 in FIG. 1.

Preferably, the tape recorder 10 is remote-controlled by a system of the type described in co-pending patent application Ser. No. 849,033 filed on Nov. 7, 1977 in the name of the applicants. In this system, the magnetic tape used comprises an audio-track for recording sound data and an address track. The latter is provided with coded words which divide the tape into consecutive sections, each associated with a particular address. A detector 18, for example of the optical type, is mounted adjacent to one of the tape recorder reels, or adjacent to the axis thereof, and is connected with counting means for supplying an approximate position information relative to the section of the tape being in front of the reading head 17.

The remote control system associated with the tape recorder 10 is operated to advance a tape section, bearing a predetermined address, to the level of the reading head.

To this end, a first phase of fast positioning is controlled by considering the approximate position information. Then, at the end of this phase, an exact position information is delivered by reading of the address track and decoding, by means of a circuit 19 connected to the head 17, of the address of the tape section being in front of head 17. When necessary, a second phase of positioning is then effected, at least partly at fast speed, in order to advance the desired tape section to the level of the reading head. The reproduction of the audio information recorded on the tape can then be initiated.

The control signals applied to the control circuit 11 are delivered at the output terminals of a parallel interface circuit 31, for example of the PIO 3881 type, connected to a processing unit consisting essentially for example of a microprocessor of the Z80 type having a central unit 32 and memories 33. A serial interface circuit 34, for example of the USART or SIO 3884 type, connects the central unit 32 to the decoding circuit 19.

This remote control system and a particular mode of programming of the micro-processor are described in detail in the above-mentioned U.S. patent application to which reference can be made.

The projector 20 comprises stepwise drive means for advancing a cinematographic film 21 in front of a projection gate 22. Driving is effected by a pulse controlled step motor. The frequency of the control pulses applied to the step motor determines the running speed of film 21. These pulses are delivered by a variable frequency pulse generator 23.

A suitable projector having a variable advance speed of image frames is described in U.S. Pat. No. 3,849,715. Pulses of generator 23 controlling the delivering by a control circuit 24 of a train of pulses which comprises a determined number of pulses successively applied to the excitation coils of a stepping motor having a rotor directly engaged with a toothed wheel meshing with the film. This known control circuit 24 also comprises means for reversing the direction of rotation of the motor, and consequently the direction in which the film is advanced, according to the level of a signal applied to an input terminal 24a of circuit 24.

A parallel interface circuit 35, for example of the PIO 3881 type, has two control output terminals connected respectively to the input terminal 24a of circuit 24 and to a relay 25 serially connected to the supply circuit of the lamp 26 of projector 20.

The output terminals of a binary up-and-down counter 27 are connected in parallel to input terminals of the interface circuit 35. This up-and-down counter receives the pulses of generator 23, and operates in counting or decounting in response to the signal applied to the input terminal 24a of circuit 24. The zero reset control input terminal of the up-and-down counter 27 is connected to a detector 28, which delivers a zero reset control signal in response to the detection of a mark, for example a magnetic mark, associated with an initial reference image frame of the film. Thus, the content of the up-and-down counter permanently represents the address of the image frame which is in front of the gate 22. This address is, for example, the number of this image frame, when the image frames of the film are numbered continuously from the beginning to the end.

An audiovisual sequence to be reproduced is defined by a set of data elements including the addresses of the image frames at the beginning and at the end of the video part of the sequence, the addresses of the tape sections corresponding to the beginning and to the end of the audio part of the sequence, and, if necessary, the running speed of the image frames during this sequence. It will be noted that, if the running speed of the image frames does not vary during the sequence, it can be obtained from the other data elements, since the latters enable determination of the number of images to be projected and the normal time period during which the tape runs, i.e. the normal duration of the sequence.

Before reproducing a predetermined audiovisual sequence, at least the addresses identifying the beginning and end of the audio and video parts of the sequence are stored in registers. These addresses can be either directly entered, or extracted from memories 33 in the form of set of data elements characterizing the sequence to be reproduced.

The first operating phase consists in the positioning of the film and the magnetic tape, in such a manner as to advance the image frame, corresponding to the beginning of the video part of the sequence, to the level of the projection gate, and to advance the tape section, corresponding to the beginning of the audio part of the sequence, to the level of the reading head.

FIA and LIA will hereinafter designate the addresses of the first and last image frames of the video part of an audiovisual sequence, and FSA and LSA the addresses of the first and last tape sections of the audio part of the same audiovisual sequence. AIA is the address of the image frame which is at a given moment in front of gate 22, this address being permanently up-dated in a register of the micro-processor. ASA is the address of the tape section which is in front of the reading head 17, this address being permanently up-dated in another register [ASA] of the micro-processor, as explained below.

The reproduction of an audiovisual sequence comprises the following operations:
  entering the data elements defining the sequence, and registration thereof, including, if necessary after calculation, the running speed CAD of the image frames during the sequence,
  remote control of the projector to position the image frame of address FIA in front of gate 22,
  remote control of the tape drive means in order to position the tape section of address FSA immediately upstream of reading head 17,
  starting of the tape at normal speed,
  starting of the sound reproduction, lighting of lamp 26, and adjustment of generator 23 at value CAD when the tape section of address FSA runs in front of head 17,
  continuation of the sequence until the image frame of address LIA and the tape section of address LSA reach respectively gate 22 and reading head 17.

Figure 3:
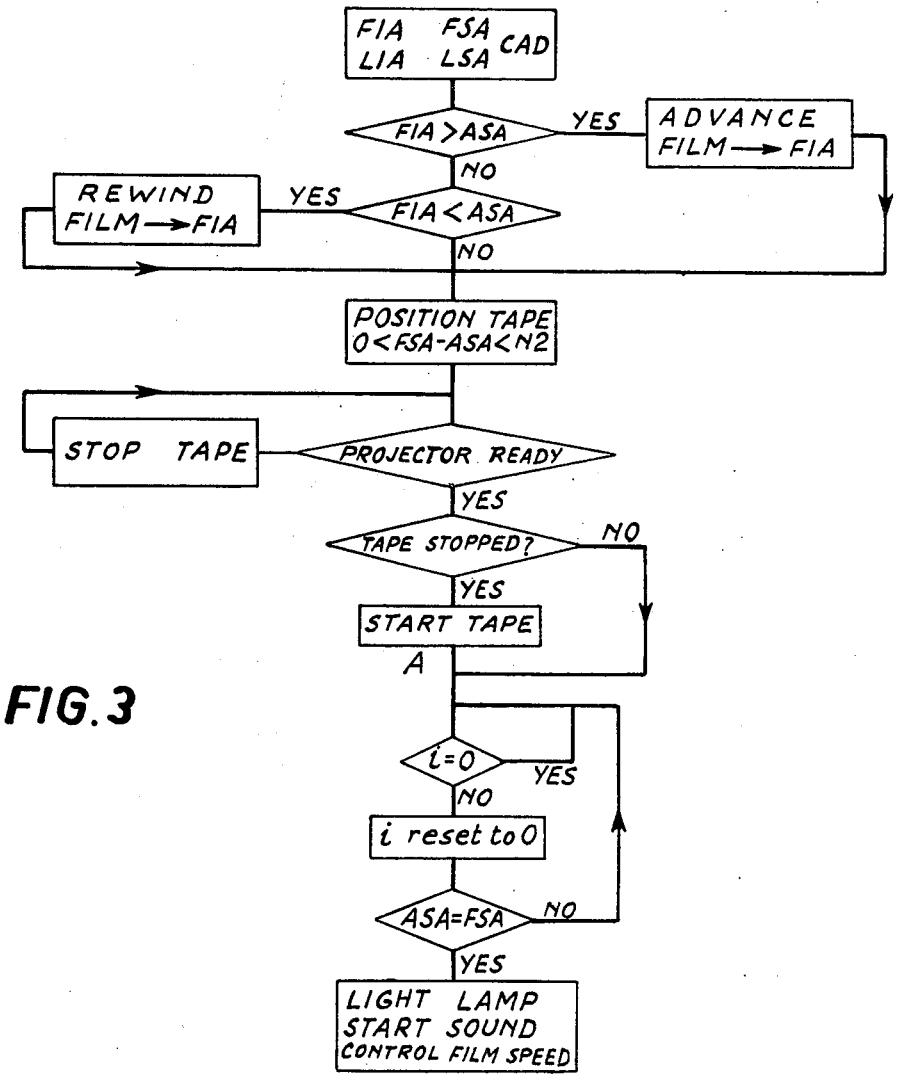
FIGS. 3 to 5 are programmation block-diagrams of the micro-processor included in the apparatus of FIG. 1.

The control of these operations is effected by means of the micro-processor 32, for example in accordance with a subroutine of sequence initiation, the block diagram of which is illustrated by FIG. 3.

If not pre-recorded, the speed CAD is calculated as follows:

$$CAD = K(LIA - FIA/LSA - FSA)$$

where K is a constant which is a function of the running speed of the tape. It is assumed, in this case, that the addresses of the image frames correspond, as indicated above to the numbers of these images and that the addresses of the tape sections represent the distance between these sections and an origin point at the beginning of the tape.

The remote control of projector 20 is performed by comparing FIA and AIA, the latter being supplied by the up-and-down counter 27 and transmitted by the interface circuit 35.

If FIA>AIA, a forward motion control signal is applied to input terminal 24a and operation of generator 23 is started to control the running of film 21 at fast speed. The values FIA and AIA are then permanently compared, and a signal inhibiting operation of generator 23—and hence stopping the advance of the film—is delivered as soon as the equality is acknowledged.

If FIA≦AIA, the relation FIA<AIA is first tested and, if true, an operation similar to the previous one is controlled with the film 21 running in the other direction. If FIA=AIA, the initial positioning of the film is already realized.

It should be noted, as will be described hereinafter, that the generator 23 may consist of a programmable frequency divider connected to a time base. During the initial film positioning phase, this generator is programmed to deliver pulses of relatively high frequency, in order to perform an initial positioning of the film at fast speed. The initiation and inhibition of the generator are, for example, obtained by validating or not the output thereof by means of a gate having a control input receiving a validation signal as long as the inequality between FIA and AIA is verified. As soon as the equality FIA=AIA is true, an inhibition signal is applied to this control input.

The end of the initial film positioning phase enables the remote control of tape recorder 20, so as to advance the tape section FSA close to head 17.

The tape recorder remote control is performed under the control of the micro-processor 32 as indicated in detail in the above-mentioned U.S. patent application Ser. No. 849,033.

As described in this application, this remote control is performed in a number of steps by operating the fast forward and/or rewind control means, so as to optimize the time necessary to position a tape section having an address lower than but adjacent to FSA in front of the reading head. In said application, it is explained that the passage of a coded word of the address track in front of the reading head, during normal tape advance, controls an interruption of the monitoring program making it possible to up-date the register [ASA]. An interruption program which is more elaborated, but has a similar object, is explained below and diagrammatically illustrated by FIG. 4. A fast positioning of the tape is thereby performed so as to advance a tape section having an address comprised between FSA and FSA—N2, N2 being a number corresponding to a few tape sections (for example 2 or 3) in order to make sure that the tape section of address FSA is upstream of the reading head.

After the end of the tape fast positioning, the running of the tape can be controlled (which enables to up-date continuously the value of ASA as will be indicated hereinafter with reference to FIG. 4) because the projector has been previously positioned.

The initial positioning of the video and audio supports may be remote-controlled, not sequentially as described above, but simultaneously. In this last case, it is necessary to stop the tape at the end of the fast positioning thereof, if the image frame of address FIA is not yet in front of the projection gate.

The start proper of the restitution of an audiovisual sequence takes place at point A of the block-diagram of FIG. 3, the image frame of address FIA being in front of the projection gate (test projector ready positive), the audiotape running at normal speed (test tape stopped negative), the tape section of address FSA being upstream, but close to the reading head.

If an index i is not equal to 0, it is reset to zero and equality FSA=ASA is tested.

When this relation is verified, the reproduction of the audiovisual sequence may start, the reproduction of audio information (control means 16) and the lighting of lamp 26 being simultaneously controlled. At the same time, the operation of generator 23 is started, the running speed of image frames CAD being determined either directly from recorded data or by calculation performed by the micro-processor.

When CAD is predetermined at the beginning of the reproduction of the sequence, interruptions of the main monitoring program take place in principle for each reading of a new image frame address and a new tape section address The end of a sequence is controlled by the result of a sequence end test, for stopping the projector when the value AIA available at the output terminals of the up-and-down counter 27 is equal to LIA and when the address ASA read is equal to LSA. The stopping of the tape and the film are respectively controlled by action on the stopping control means 14 and by inhibition of the generator 23.

If the audiovisual sequences are short, the risk of desynchronization between the film and the tape is limited. Furthermore, resynchronizing will automatically take place at the beginning of the following sequence.

However, a limitation of the length of the sequence may have some drawbacks and it is then desirable to adjust the running speed of one of the audio and video supports as a function of the running speed of the other support. Since the eye is practically not sensitive to slight variations in the running speed of the image frames during projection, while the ear is very sensitive to the variations of the running speed of an audio magnetic tape (or any other audio support), it is preferable to slave the former speed to the latter.

Figure 2:
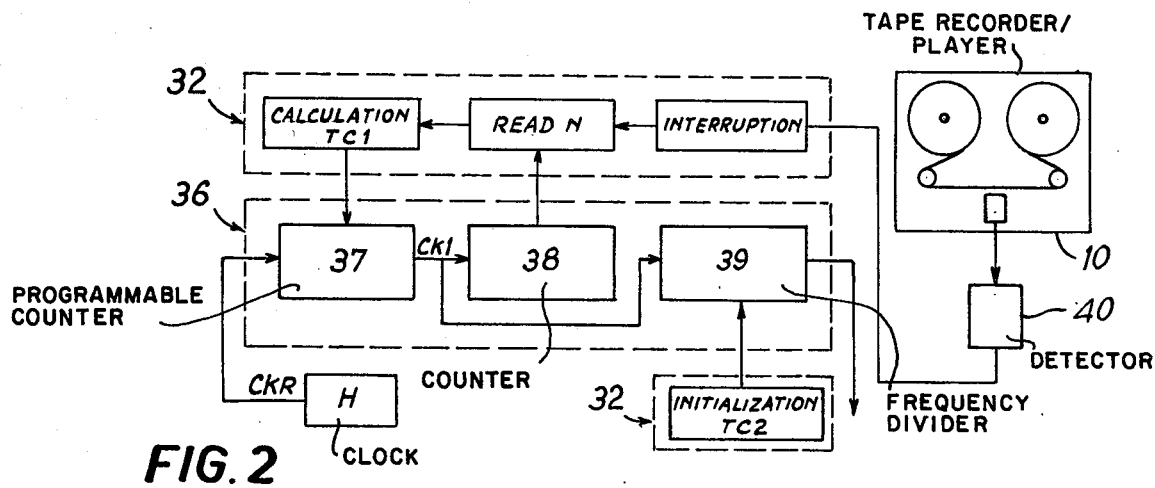
FIG. 2 is a more detailed view of slaving means which are part of the apparatus of FIG. 1.

This can be performed by means of the circuit illustrated in particular by FIG. 2. This circuit comprises, for example, a micro-circuit 36 of CTC type ("Counter Timer Circuit") connected to the micro-processor 32.

The circuit 36 comprises a programmable counter 37 which receives high frequency CKR pulses delivered by a reference high frequency clock H (for example a 2.5 MHz clock).

The programmable counter 37 constitutes a programmable frequency divider, or programmable clock. The time constant TC1 of this circuit is determined by programming effected under the control of the microprocessor. The pulses CK1 delivered by the time base 37 are applied to a counter 38 and to a second programmable frequency divider, or programmable clock 39.

The time constant TC2 of circuit 39 is determined by means of the micro-processor 32. Circuit 39 constitutes in fact the variable frequency generator 23, the time constant TC2 being programmed as a function of the desired image frames running speed.

The audio tape is provided with regularly spaced marks, and a detector 40 delivers a signal in response to the detection of one of these marks carried by the tape. These marks can advantageously consist in said coded words regularly spaced along the address track. The detector may then possibly consist in the decoding circuit 19 which delivers then a signal in response to the detection of a coded word of the address track.

Figure 4:
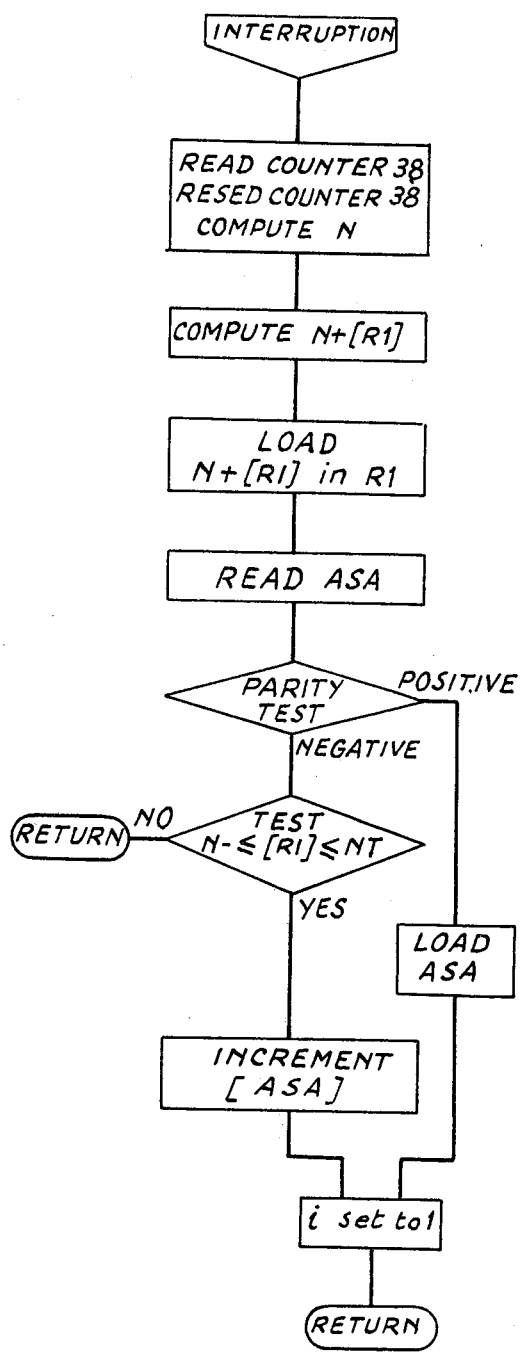

Each signal delivered by the detector 40 controls a program interruption in order to perform the operations of the sub-routine which block-diagram is illustrated by FIG. 4.

During each interruption, the content N of counter 38 is read, and this counter is thereafter reset to zero. The number N therefore represents the number of pulses CK1 between two readings of coded words on the address track of the tape.

This number N is added to the content of a register [R1], and this sum is recorded in the register [R1]; the latter being then normally reset to zero (see herein after).

The address corresponding to the coded word, the detection of which has started the program interruption, is then read. A usual parity test is performed on the word read. If the parity is correct, the address is stored in register [ASA]. If the parity is incorrect, a test of probability is effected by examining if N has a value comprised between two predetermined values N− and N+. If the test is positive, the register [ASA] is incremented by one unit; if not, the content of register [ASA] is not modified and return is made to the monitoring program, in expectation of the next interruption.

If the register [ASA] has been loaded by the new address read, or incremented, the index i is set to 1 and return is effected to the monitoring program.

As indicated hereinbefore the time constant TC2 is representative of the image frames running speed. Therefore, for a sequence with a fixed image frames speed, TC2 should be equal to $(AS \times N)/AI$, where AS and AI respectively represent the total number of tape sections and image frames constituting the audio and video parts of the sequence.

N is an integer, but the result of the operation $(AS \times N)/AI$ is not necessarily an integer. The object of the slaving means is to subject TC2 to the eventual variations of N, while surmounting the difficulty mentioned in the preceding phrase.

A first slaving method (FIG. 2 and FIG. 5, the latter illustrated a block diagram of a calculation sub-routine adapted to said method) consists in slaving N to a nominal value $N'_o$ by action on the programmable clock 37, i.e. by computing by program the time constant TC1 of this clock.

TC1 is determined, before the reproduction of a sequence, in order that the number of pulses CK1, counted between the detections of two consecutive coded words on the address track of the tape running at normal speed, be equal to a predetermined number $N_o$. TC2 is then determined as the full approximate value of $(N_o \cdot AS)/AI$ and a value $N'_o = (AI \cdot TC2)/AS$, not necessarily a full value, is deducted therefrom. TC2 and $N'_o$ are, for example, determined at the very beginning of the sub-routine illustrated in FIG. 3 (instead of the calculation of CAD), and taken into account as soon as the reproduction of audio and video information starts, a particular value of TC2 being imposed for the step of fast initial positioning of the first image frame of the sequence.

Since $N'_o$ is not an integer, it is expressed for example by a 16 bits word, 8 bits being used for the integral part. A calculation cycle, started in response to each detection of a coded word on the address track of the tape (FIG. 2 and 4) makes it possible to slave N and $N'_o$. The slaving is of the type "position slaving with phase advance" and, therefore, the cumulated relative error on N is not only considered, but also the direction of the attended adjustment. The slaving operation performed can be expressed by:

$$\frac{\Delta(TC1)_n}{TC1} = \frac{1}{N_o}\left\{ k \sum_1^n (N - N'_o) + k' [(N - N'_o)_n - (N - N'_o)_{n-1}] \right\}$$

$\Delta(TC1)_n$ is the variation calcuated for TC1 during the $n^{th}$ interruption of program.

$$\sum_1^n (N - N'_o)_n$$

is the sum of the differences between N and $N'_o$ from the first coded word detected on the address track of the tape up to the $n^{th}$. As to the factor $(N-N'_o)_n-(N-N'_o)_{n-1}$, it indicates the direction of the attended adjustment. The numbers k and k' are constants.

Figure 5:
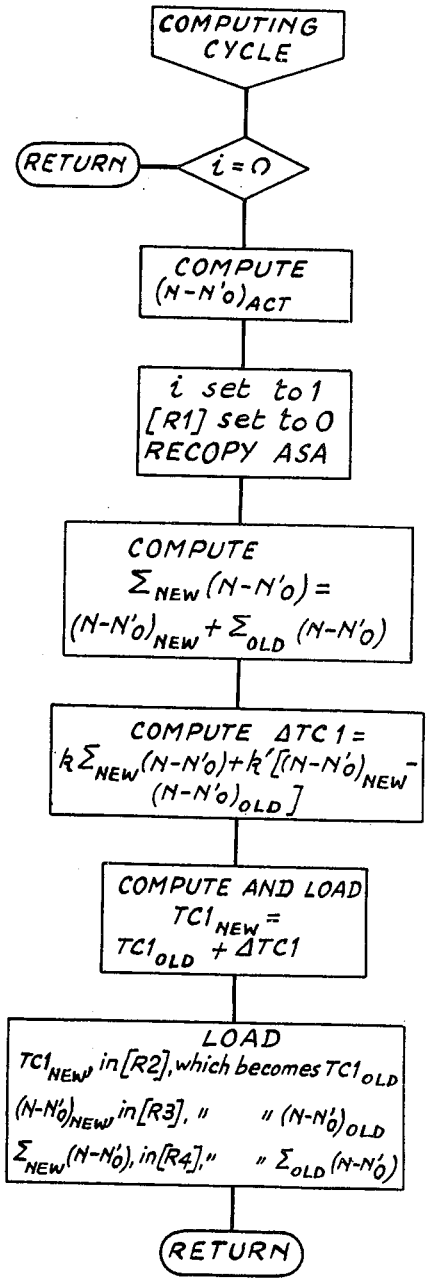

The calculation block diagram illustrated by FIG. 5 includes a first test operation on index i, so as to suspend the calculation as long as the content of [ASA] has not been modified. If index i is not equal to zero, the following operations are successively performed (FIG. 5):

calculation of the present value of $(N-N'_o)$ by determining the difference between the content of [R1] and the quantity $[(ASA)_{NEW}-(ASA)_{OLD}]\times N'_o$, $(ASA)_{NEW}$ being the present value of ASA and $(ASA)_{OLD}$ the preceding value thereof, reset to zero of index i, of [R1] and storing of $(ASA)_{NEW}$ which replaces $(ASA)_{OLD}$, calculation of the present sum of values $(N-N'_o)$ by adding the present value of $N-N'_o$ to the precedent sum, calculation of $\Delta(TC1)$ according to the formula indicated FIG. 5, calculation of the present value of TC1 by adding the calculated value of $\Delta(TC1)$ to the preceding value of TC1 and loading in clock 37 of the calculated value, and, registration in respective registers of the new values of TC1, $(N-N'_o)$ and $\Sigma(N-N'_o)$.

Then, the program is returned to the monitor program.

The slaving operation described herein before consists in slaving a programmable time base as a function of the running speed of the audio tape, the running speed of the image frames being initially determined by pre-adjustment of an adjustable frequency divider connected to this time base.

It should be noted that, with such a slaving operation, no cumulative error is possible. Furthermore, the calculation can be made on integral values of $N-N'_o$, the fraction parts being only taken into account for calculating the sum. Finally, the calculation is made at regular intervals, independently from the running speed of the image frames, and without interference of the frequency stability of clock H.

Another slaving method would consist, not in varying TC1 while keeping TC2 constant, but in keeping TC1 constant and varying TC2 by calculating a value N' such as $(AS\times N')/AI$ is an integer. When the $n^{th}$ coded word of the address track is detected, $$TC2_n = \frac{(N_n + R_{n-1})\, AS}{AI}$$

is calculated, $R_{n-1}$ being the difference $N_{n-1}-N'_{n-1}$, $N_{n-1}$ and $N'_{n-1}$ being the preceding values of N and N' for the $n-1^{th}$ detected coded word of the address track. This other embodiment then consists in modifying TC2, i.e. the ratio of a divider of programmable frequency connected to the output terminal of a time base, which ratio is initially fixed at a value determined as a function of the desired running speed of the image frames.

It should be noted, as already indicated, that the delivering of signals indicative of the running speed of the magnetic tape can be performed in response to the detection of marks carried by this tape and different from the coded words on the address track.

It should also be noted that the synchronization means could be realized at least partly in wired logic, although this would result in a "heavier" arrangement having a lower use flexibility.

What is claimed is:

1. Apparatus for reproducing an audiovisual program comprising an audio sequence and a video sequence respectively carried by different audio and video supports, the audio support carrying a plurality of audio sequences, a plurality of which are acceptable for reproduction with a video sequence and said program not being restricted to the same audio sequence with each video sequence, said apparatus comprising:

(a) first remotely controllable drive means for advancing the audio support in front of a reading head, the audio support comprising an address track with coded words dividing the audio support into consecutive sections each associated with a respective address;

(b) first detecting means responsive to said words for identifying the audio support section running in front of the reading head;

(c) second remotely controllable drive means for advancing image frames of the video support in front of a projection gate, said video support containing address information;

(d) second detecting means responsive to said address information for identifying the image frame of the video support in front of the projection gate;

(e) control data storage means external to said audio and video supports for storing data elements determining a desired audiovisual program to be reproduced, said data elements comprising an address selected from a plurality of addresses on the audio support section which corresponds to the portion of the audio support carrying the audio sequence of said desired program, separate selected identification of the first image frame of the video sequence of said desired program and the running speed of the image frames during reproduction of the video sequence of said desired program, the stored data elements being modifiable to permit selection of different audio support addresses to be included as data elements for a selected identification of an image frame whereby an audio sequence maybe selected from a plurality thereof to be reproduced with a selected video sequence; and (f) a control unit comprising:

operating means connected to the first and second drive means and receiving signals delivered by said first and second detecting means to operate said first and second drive means so as to advance a selected audio support section corresponding to the selected address and a selected predetermined image frame corresponding to the selected identification in front of the reading head and the projection gate, respectively to simultaneously reproduce the selected audio sequence and the selected video sequence, and speed adjusting means connected to said second drive means to adjust the running speed of the video support to a predetermined value, said operating means and said speed adjusting means being connected to and receiving control information from said control data storage means, the control information for the video sequence to be reproduced being independent of the motion of the audio support and said operating means having first means responsive to the audio sequence address in said data elements and to said first detecting means for thereby operating the first drive means and causing reproduction of the audio signals of the audio sequence corresponding to said last-mentioned address and having second means responsive to the image frame identification in said data elements and to said second detecting means for thereby operating the second drive means and causing projection of the image frame or frames corresponding to said last-mentioned identification.

2. Apparatus as claimed in claim 1, wherein the audio support is a magnetic tape having at least one audio track adjacent the address track, and the video support is a cinematographic film, the second drive means having an adjustable speed for adjusting the running speed of the image frames.

3. Apparatus for reproducing an audiovisual program comprising an audio sequence and a video sequence respectively carried by different audio and video supports, said program not being restricted to the same audio sequence with each video sequence, said apparatus comprising:
   (a) first remotely controllable drive means for advancing the audio support in front of a reading head, the audio support comprising an address track with coded words dividing the audio support into consecutive section each associated with a respective address;
   (b) first detecting means responsive to said words for identifying the audio support section running in front of the reading head;
   (c) second remotely controllable drive means for advancing image frames of the video support in front of a projection gate, said video support containing address information;
   (d) second detecting means responsive to said address information for identifying the image frame of the video support in front of the projection gate;
   (e) control data storage means external to said audio and video supports for storing data elements relative to a desired audiovisual program to be reproduced, said data elements comprising selectable addresses corresponding to the audio portion of the audio support carrying the audio sequence of said desired program, selectable identification of the first image frame of the video sequence of said desired program and the running speed of the image frames during reproduction of the video sequence of said desired program, whereby an audio sequence may be selected from a plurality thereof to be reproduced with a selected video sequence; and
   (f) a control unit comprising:
      operating means connected to the first and second drive means and receiving signals delivered by said first and second detecting means to operate said first and second drive means so as to advance a selected audio support section or predetermined address and a selected predetermined image frame in front of the reading head and the projection gate, respectively, said second drive means being pulse responsive and operating at a speed dependent on the frequency of pulses received thereby, and
      speed adjusting means connected to said second drive means to adjust the running speed of the video support to a predetermined value, said speed adjusting means comprising:
         a time-base delivering clock pulses
         an adjustable frequency divider connected to said time-base and delivering to said second drive means a pulse signal having a frequency which determines the running speed of the video support, the ratio of said frequency divider being adjusted by a data element delivered to said frequency divider by the control data storage means, and
         speed correction means receiving a signal representative of the running speed of the audio support and connected to one of said time-base and said divider for correcting the frequency of said pulse signal as a function of the variation of the running speed of the audio support;
      said operating means and said speed adjusting means being connected to and receiving control information from said control data storage means, the control information for the video sequence to be reproduced being independent of the motion of the audio support.

4. Apparatus as claimed in claim 3 wherein the speed correction means is connected to the time-base for modifying the frequency of the clock pulses delivered by the time-base as a function of the variation of the running speed of the audio support.

5. Apparatus as claimed in claim 3, wherein the speed correction means are connected to the frequency divider for modifying the ratio thereof as a function of the variation of the running speed of the audio support.

6. Apparatus as claimed in claim 3, further comprising mark detection means for detecting marks carried by the audio support and delivering said signal representative of the running speed of the audio support.

7. Apparatus as claimed in claim 6, wherein said speed correction means comprises computing means operated in response to the detection of each one of said marks for performing a computing cycle including the counting of clock pulses issued between two successive detections of marks carried by the audio support.

8. Apparatus as claimed in claim 6, wherein said coded words carried by the address track are recorded at regular intervals so as to constitute said marks.

* * * * *

UNITED STATES PATENT AND TRADEMARK OFFICE
CERTIFICATE OF CORRECTION

PATENT NO. : 4,204,751
DATED : May 27, 1980
INVENTOR(S) : GAME & TIESSE

It is certified that error appears in the above-identified patent and that said Letters Patent are hereby corrected as shown below:

```
Column 4, line 14, change "controlling" to --control--
Column 6, line 17, change "this" to --said--
Column 6, line 68, after "address" insert a period (.)

Claim 3, line 27, change "section" to --sections--.
```

Signed and Sealed this

Ninth Day of December 1980

[SEAL]

Attest:

SIDNEY A. DIAMOND

Attesting Officer      Commissioner of Patents and Trademarks